United States Patent
Koelle et al.

(10) Patent No.: US 6,561,947 B2
(45) Date of Patent: May 13, 2003

(54) DRIVE ASSEMBLY AND METHOD FOR CONTROLLING A GEAR SHIFT OPERATION IN A DRIVE ASSEMBLY OF A MOTOR VEHICLE

(75) Inventors: Gerhard Koelle, Wiernsheim (DE); Harald Tschentscher, Grossbottwar (DE); Simon-Florian Gzerny, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/732,061

(22) Filed: Dec. 7, 2000

(65) Prior Publication Data
US 2002/0032097 A1 Mar. 14, 2002

(30) Foreign Application Priority Data
Dec. 28, 1999 (DE) .......................... 199 63 400

(51) Int. Cl.[7] .......................... B60K 1/02; B60K 41/02; H02P 15/00; H02P 17/00
(52) U.S. Cl. .................. 477/3; 477/5; 477/6; 477/8; 477/15; 180/65.2
(58) Field of Search ............... 477/3, 5, 6, 13, 477/14, 15, 8; 475/4, 5; 180/65.2–65.6

(56) References Cited
U.S. PATENT DOCUMENTS 4,589,532 A * 5/1986 Ito et al. .......................... 192/3
5,749,448 A * 5/1998 Maile ........................ 192/4 A
5,771,478 A * 6/1998 Tsukamoto et al. ............ 701/68
5,839,533 A * 11/1998 Mikami et al. ............. 180/165

FOREIGN PATENT DOCUMENTS

DE   19745995        9/1998
JP   11275710      * 10/1999

* cited by examiner

Primary Examiner—Sherry Estremsky
Assistant Examiner—Tisha D. Lewis
(74) Attorney, Agent, or Firm—Baker & Daniels

(57) ABSTRACT

A method for controlling gear shifting in a motor vehicle which utilizes a drive assembly that includes an internal combustion engine having an output shaft, a multiple-gear transmission having a transmission input and a transmission output shaft that be selective coupled and uncoupled from one another, a main clutch assembly capable of causing the transmission input shaft and output shaft to be selectively coupled or uncoupled, an electrical machine capable of being selectively coupled to the transmission input shaft via an intermediate transmission, and a control unit for controlling the electrical machine and/or the intermediate transmission during gear shifting, as a function of a standard shift value provided to the transmission along with the operating parameters and the operating states of the components. According to the method, when the operator manipulates the gear shift lever for the main clutch and/or opens the same, a possible standard shift value and its associated transmission ratio (ip) are predicted, and the operating parameters and operating states of the electrical machine and of the control unit are controlled during the gear shift as a function of the possible standard shift value.

10 Claims, 2 Drawing Sheets

DRIVE ASSEMBLY AND METHOD FOR CONTROLLING A GEAR SHIFT OPERATION IN A DRIVE ASSEMBLY OF A MOTOR VEHICLE

BACKGROUND OF THE INVENTION

The present invention relates to a method for controlling a gear shift operation in the drive assembly of a motor vehicle and a drive assembly for implementing the method.

Today's motor vehicles usually have an internal combustion engine which acts upon the drive wheels of the motor vehicles via a transmission gear, whereby a transmission input shaft is coupled to an output shaft of the internal combustion engine. In order to change the gear ratio of the transmission gear (gear shift operation), the transmission input shaft and the output shaft must be separated by activating a main clutch. In most cases, this is accompanied by the disengagement of the coupling between all secondary assemblies and the transmission input shaft, including an electrical machine. Following this, a previously selected transmission ratio step can be taken out. When a new transmission ratio step is engaged, the revolutions per minute are adjusted between the transmission input shaft and a transmission output shaft (synchronization) solely by means of coupling elements, such as for instance synchronizer rings. Following the RPM adjustment, the main clutch is closed again. The disadvantage of this method is that the gear synchronization achieved by means of synchronizer rings leads to relatively high mechanical loads, accompanied by significant wear and tear to clutch elements which causes the synchronization effect to deteriorate over time.

There are known drive assemblies in which the electrical machine acts directly upon the transmission input shaft. During any change in the transmission ratio step, the electrical machine places a load in the form of an additional mass inertia on the transmission input shaft and hence on the synchronizer rings. DE 197 45 995 discloses an electrical machine that engages with a transmission input shaft through a controllable intermediate transmission. This either causes the load to be canceled when the intermediate transmission assumes a neutral position, or the RPM adjustment of the transmission input shaft and the transmission output shaft to be assisted by using an appropriate control. However, the method described in DE 197 45 995 is limited to automatic transmissions, since the shift direction is determined by an associated electronic control device. This method is unsuited for controlling manual transmissions, since the shift direction and the shift moment cannot be predicted with certainty.

SUMMARY OF THE INVENTION

The drive assembly of the present invention, as well as the method for controlling the gear shift allow for the use of an electrical machine that is connected to the transmission input shaft and assists gear synchronization in automatic and manual transmissions. The drive assembly includes at least the following components:

an internal combustion engine with an output shaft, a manual transmission having multiple gears, and a transmission input shaft and a transmission output shaft which can be uncoupled from each other, a main clutch which can force the transmission input shaft to actively engage with the output shaft;

an electrical machine which can be made to engage with the transmission input shaft via an intermediate transmission, and a control unit for controlling the electrical machine and/or the intermediate transmission during gear shifting, as a function of a standard shift value sent to the transmission, and of the operating parameters and the operating size of the components.

By combining the above-listed components, the electrical machine can assist the gear shift process of a manual transmission having multiple gears. When the operator manipulates the gear shift lever for the main clutch and/or opening the main clutch, a possible standard shift value and its associated transmission ratio are predicted and the operating parameters and operating state of the electrical machine and/or the intermediate transmission are controlled during the gear shifting as a function of the possible standard shift value. This allows the mechanical load on the clutch elements to be appreciably reduced over the entire period of operation.

The possible gear shift is preferably determined by means of a characteristic diagram in which the operator's driving style, the operating parameters, and the operating state of the components are captured. This, for example, allows the operator's driving style to be evaluated in terms of a performance- or fuel consumption-oriented driving operation.

The operating parameters that can be considered include values such as the engine RPM, an activation signal for the gear shift lever, the transmission input and transmission output speeds, the vehicle's traveling speed, the vehicle's acceleration rate, the RPM of the electrical machine, and the intervals between various gear shifts. The operating states include, for example, the driving pedal positions for gas or brake, the transmission ratio of the transmission or the intermediate transmission, and the operating mode of the electrical machine or the main clutch.

It has also been found to be advantageous to include an evaluation factor in the shift characteristic table or diagram, which is adjusted as a function of agreement between the predicted transmission ratio and the selected transmission ratio (a self-learning diagram). To this end, the evaluation factor is assigned to predetermined combinations of operating parameters and/or operating states. Thus, if the transmission ratios do not agree, for instance if the evaluation factor is reduced, the invention allows the operator's shifting style to be predicted with an increasingly higher probability as the vehicle is operated for longer periods of times.

It has also been shown to be advantageous if, in order to control gear shifting:

(a) a rated transmission input speed is determined together with the transmission input speed and the predicted transmission ratio, (b) a comparison of the rated transmission input speed with the transmission input speed shows a deviation (c) the deviation serves to determine and subsequently adjust the operating states of the electrical machine and the intermediate transmission, as well as the transmission ratio of the intermediate transmission, (d) after declutching the main clutch, the transmission input speed is adjusted by means of the electrical machine to the rated transmission input speed, and (e) the electrical machine is uncoupled if the predicted transmission ratio does not agree with the actually selected transmission ratio.

The above-described method allows the gear synchronization to be effected in a particularly secure manner.

It is especially advantageous to switch the electrical machine to generator operation in the event the RPM exceeds the rated speed. Conversely, the torque that is to be transmitted to the transmission input shaft can then be selected, in the engine mode, by specifying the RPM of the electrical machine and/or the transmission ratio of the intermediate transmission.

Additional preferred embodiments of the invention are evident from the remaining characteristics indicated in the dependent claims.

BRIEF DESCRIPTION OF THE DRAWINGS

The above mentioned and other features and objects of this invention, and the manner of attaining them, will become more apparent and the invention itself will be better understood by reference to the following description of the invention taken in conjunction with the accompanying drawings, wherein.

Figure 1:
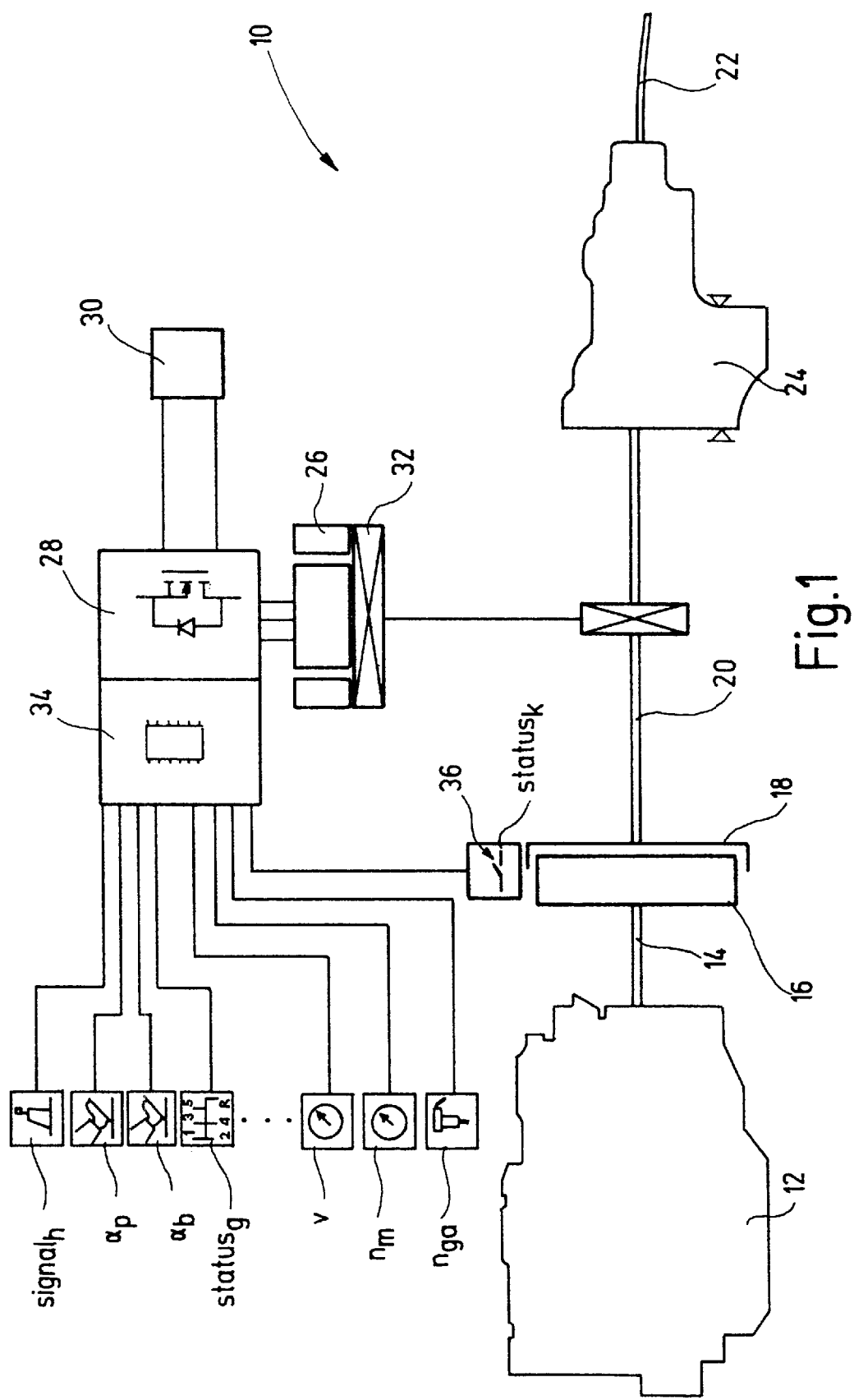
FIG. 1 is a schematic illustration of a drive assembly of a motor vehicle.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION OF THE PREFERRED EMBODIMENTS

The embodiments disclosed below are not intended to be exhaustive or limit the invention to the precise forms disclosed in the following detailed description. Rather, the embodiments are chosen and described so that others skilled in the art may utilize their teachings.

In the following, an exemplary embodiment of the invention will be explained on the basis of the pertinent drawings.

FIG. 1 is a schematic illustration of a drive assembly 10 of a motor vehicle. The drive assembly 10 comprises an internal combustion engine 12 whose output shaft 14 is connected to a disk flywheel 16 so as to be torsionally rigid therewith. The output shaft 14 can be made to engage transmission input shaft 20 via a main clutch 18. The drive assembly 10 further comprises a transmission 24, which acts on the drive wheels of the motor vehicle via a transmission output shaft 22. The transmission 24 has several transmission ratio steps which can be selected manually, such as by a gear shift lever.

The drive assembly 10 further comprises an electrical machine 26, which can optionally be operated as a generator or as an engine. When the electrical machine 26 is operated in a generator mode, on board electrical system 30 is supplied with electric energy via a current inverter 28. The electrical machine 26 effectively engages transmission input shaft 20 via an intermediate transmission 32. This intermediate transmission 32 includes several transmission ratio steps as well as a neutral position.

During gear shift operation, the interaction of the electrical machine 26 and/or the intermediate transmission 32 is coordinated by means of a control unit 34. To this end, the control unit 34 provides the operating parameters and operating states of the components, for example by means such as clutch sensor 36. Additional examples of operating parameters and operating states that can be used include an activation signal (referred to herein as both $status_h$ and $signal_h$) for a gear shift lever, an accelerator pedal position $\alpha_p$ of a gas pedal, a pedal position $\alpha_b$ of a brake pedal, a transmission ratio step $status_g$ of transmission 24, a vehicle speed v, and the engine RPM $n_{ga}$. If an action taken by the operator signals a change in the transmission ratio step $status_g$, for instance through the activation signal ($signal_h$) of the gear shift lever, the operating parameters and the operating states of the various components are interpreted in a manner which will be explained in greater detail further on, and this is followed by the electrical machine 26 and/or the intermediate transmission 32 being controlled during the gear shifting. The means and procedures for controlling these components are sufficiently known and therefore need not be further explained here.

Figure 2:
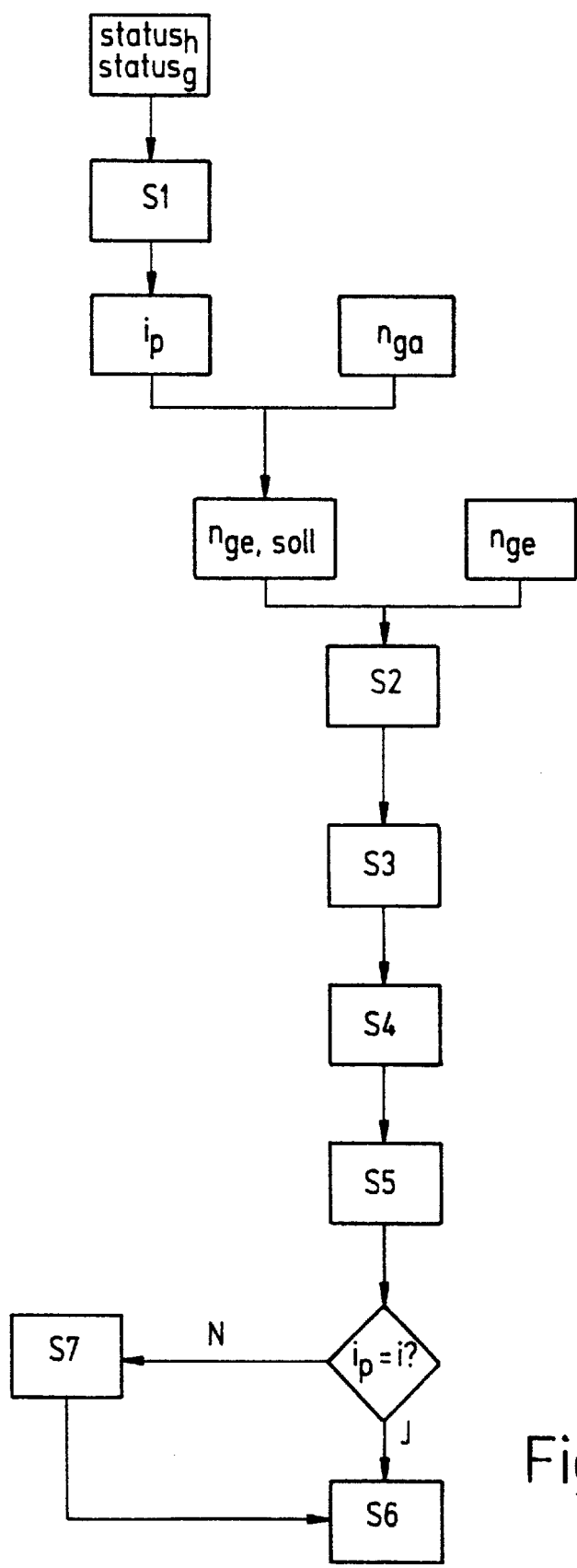
FIG. 2 is a functional diagram of the control of a gear synchronization.

FIG. 2 shows a functional diagram that depicts how the gear synchronization is controlled as gear shifting takes place in the drive assembly 10. First, a suitable sensor mechanism measures the activation signal $status_h$ for the gear shift lever and/or the operational mode of the clutch $status_k$. If the operator manipulates the gear shift lever and/or disengages the main clutch 18, a predicted transmission ratio $i_p$ is determined. This can occur in step S1 by means of a characteristic diagram or table in which the operator's driving style, the operating parameters and the operating states of the components are captured.

In this process, the operating parameters can comprise the engine RPM $n_m$, the transmission input RPM $n_{ge}$ and output RPM $n_{ga}$, the vehicle speed v, the vehicle acceleration a, the RPM of the electrical machine $RPMn_{em}$, the activation signal $status_h$ of the gear shift lever, or a time interval $t_s$ between various gear shifts. In addition, operating states, such as the accelerator pedal positions $\alpha_p$, the gas and brake pedal positions $\alpha_b$, the transmission ratio steps $status_g$, the status z of the transmission 24 and the intermediate transmission 32, the operating mode $status_k$ of the clutch 18, and an operating mode $status_{em}$ of the electrical machine 26, can also be captured or incorporated into the characteristic diagram.

Evaluation factors can also be incorporated into the characteristic diagram. For example, an evaluation factor $f_{fb}$, corresponding to the operator's driving style in terms of performance and fuel consumption-oriented operation can also be incorporated into the characteristic diagram. Additionally, evaluation factors $f_{fv}$ can be assigned to standard combinations of operating parameters and/or operating states. If it is subsequently determined that the predicted transmission ratio is at variance with the actually occurring or selected transmission ratio, the evaluation factor $f_{fv}$, or factors, can be used to correct the value captured by the characteristic diagram by changing the evaluation factor $f_{fv}$. A control of this type and, where applicable, a modification of the prediction thus generates a self-learning characteristic diagram (adaptive logic).

Rated transmission input RPM $n_{ge,soll}$ can be calculated based on the current transmission output RPM $n_{ga}$ and the predicted transmission ratio $i_p$. The current transmission out RPM $n_{ge}$ and the rated transmission input RPM $n_{ge,soll}$ are then compared in a step S2. If they agree, no gear synchronization is of course necessary and gear shifting can continue in the conventional manner. If the comparison of the actual or current transmission output RPM $n_{ga}$ with the rated transmission input RPM $n_{ge,soll}$ in step S2 reveals that they do not agree, the operating states of the intermediate transmission 32 and/or the electrical machine 26 are adjusted to the resulting new requirements.

Depending on the mathematical sign and the scope or magnitude of the deviation of the actual or current transmission output RPM $n_{ga}$ with the rated transmission input RPM $n_{ge,soll}$ determined in step S2, it is possible to specify rated values for the electrical machine 26 and the intermediate transmission 32 via a characteristic diagram in step S3. If for example, the current transmission input RPM $n_{ge}$ exceeds the rated transmission output RPM $n_{ge,soll}$, the generator mode will be chosen as the operating mode $status_{em}$ of the electrical machine 26, and the rotational moment of inertia of the electrical machine 26 will be used to brake the transmission input shaft 20. If, on the other hand, the current transmission output RPM $n_{ge}$ is smaller than the rated transmission input RPM $n_{ge,soll}$, the operating mode $status_{em}$ of the electrical machine 26 will of course be the engine mode. The torque that is to be transmitted can be selected via the $RPMn_{em}$ of the electrical machine 26 and the transmission ratio $i_z$ of the intermediate transmission 32.

After factoring out the transmission ratio $status_g$ of the transmission 24 in step S4, the transmission input RPM $n_{ge}$ is regulated to the value of the rated transmission input RPM $n_{ge,soll}$ in step S5 via the electrical machine 26 or, respectively, the intermediate transmission 32. Before closing the clutch in step S6, it must be verified whether the predicted transmission ratio $i_p$ agrees with the actually selected transmission ratio i. If predicted transmission ratio $i_p$ does not agree with the actually selected transmission ratio i, the clutch between the electrical machine 26 and the transmission input shaft 20 is released, and the RPM differential must be adjusted conventionally via the synchronizer rings in step S7. If the predicted transmission ratio $i_p$ agrees with the actually selected transmission ratio i, any possibly remaining minor RPM differentials are likewise compensated for by the synchronizer rings before the main clutch 18 is finally closed.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method for controlling gear shifting in a drive assembly for a motor vehicle, which method comprises:
   providing the motor vehicle with a drive assembly that includes:
   a) an internal combustion engine having an output shaft;
   b) a main transmission having multiple gears, a transmission input shaft and a transmission output shaft, said transmission input shaft and said transmission output shaft being configured to be selectively coupled to and uncoupled from one another;
   c) a main clutch assembly which effects the selective coupling and uncoupling of the transmission input and output shafts;
   d) an intermediate transmission;
   e) an electrical machine which is configured to be selectively coupled to the transmission input shaft via the intermediate transmission; and
   f) a control unit for controlling at least one of the electrical machine and the intermediate transmission during a gear shifting operation;
   predicting a possible shift value for the transmission along with a transmission ratio ($i_p$) when an operator of the motor vehicle effects at least one of manipulating a gear shift lever for the main clutch assembly and opening the main clutch; and
   controlling the operating parameters and operating states of at least one of the electrical machine and the intermediate transmission as a function of the predicted possible shift value, during a gear shift.

2. A method according to claim 1, further comprising:
   providing a characteristic diagram, in which at least one of the operator's driving style, the operating parameters of the motor vehicle, and the operating states of the drive assembly components are stored; and
   determining the possible shift value from the characteristic diagram.

3. A method according to claim 1, wherein the operating parameters comprise an engine RPM ($n_m$), an activation signal ($signal_h$) for the gear shift lever, a transmission input ($RPMn_{ge}$), a transmission output ($RPMn_{ga}$), a vehicle speed (v), an acceleration (a), an RPM ($n_{cm}$) of the electrical machine, and a time lapse ($t_s$) between gear shifts.

4. A method according to claim 1, wherein the operating states comprise a driving pedal position ($\alpha_p$) for a gas pedal, a driving pedal position ($\alpha_b$) for a brake pedal, an operating mode of the main clutch, a transmission ratio step ($status_g$) of the transmission, a transmission ratio step ($status_z$) of the intermediate transmission, and an operating mode ($status_{em}$) of the electrical machine.

5. A method according to claim 2, wherein the characteristic diagram comprises an evaluation factor ($f_{fv}$) that corresponds to a combination of operating parameters and/or operating states, and has a value that is adjusted as a function of an actual gear shift.

6. A method according to claim 2, wherein the operator's driving style comprises an evaluation factor ($f_{fb}$) that is based upon at least one of a performance driving operation and a fuel consumption-oriented driving operation.

7. A method for controlling gear shifting in a drive assembly for a motor vehicle, which method comprises:
   providing the motor vehicle with a drive assembly that includes:
   a) an internal combustion engine having an output shaft;
   b) a main transmission having multiple gears, a transmission input shaft and a transmission output shaft, said transmission input shaft and said transmission output shaft being configured to be selectively coupled to and uncoupled from one another;
   c) a main clutch assembly which effects the selective coupling and uncoupling of the transmission input and output shafts;
   d) an intermediate transmission;
   e) an electrical machine which is configured to be selectively coupled to the transmission input shaft via the intermediate transmission;
   f) a control unit for controlling at least one of the electrical machine and the intermediate transmission during a gear shifting operation;
   predicting a possible shift value for the transmission along with a transmission ratio ($i_p$) when an operator of the motor vehicle effects at least one of manipulating a gear shift lever for the main clutch assembly and opening the main clutch;
   controlling the operating parameters and operating states of at least one of the electrical machine and the intermediate transmission as a function of the predicted possible shift value, during a gear shift; and wherein said method further includes:

i) generating a rated transmission input RPM ($n_{ge,soll}$) from a transmission input RPM ($n_{ga}$) and a predicted transmission ratio ($i_p$);

ii) comparing the rated transmission input RPM ($n_{ge,soll}$) with the transmission input RPM ($n_{ge}$) to determined if a deviation exists between these two parameters;

iii) using the deviation in step ii) to determine and adjust the operating states of the electrical machine ($status_{em}$) and the intermediate transmission ($status_z$), and the transmission ratio ($i_z$) of the intermediate transmission;

iv) adjusting the transmission input RPM ($n_{ge}$) to the rated transmission input RPM ($n_{ge,soll}$) by means of the electrical machine after declutching the main clutch assembly; and v) uncoupling the electrical machine from the transmission shaft if the predicted transmission ratio ($i_p$) does not agree with the transmission ratio (I) actually selected.

8. A method according to claim 7, further comprising:
changing a mode of the electrical machine to a generator mode if the current transmission input RPM ($n_{ge}$) exceeds the rated RPM ($n_{ge,soll}$).

9. A method according to claim 7, further comprising:
changing a mode of the electrical machine to an engine mode if the current transmission input RPM ($n_{ge}$) falls below the rated RPM ($n_{ge,soll}$).

10. A method according to claim 9, wherein a torque that is transmitted to the transmission input shaft, is selected from at least one of the RPM ($n_{em}$) of the electrical machine and the transmission ratio (iz) of the intermediate transmission.

* * * * *